2,965,524
ELECTRIC METAL-ARC WELDING FLUX

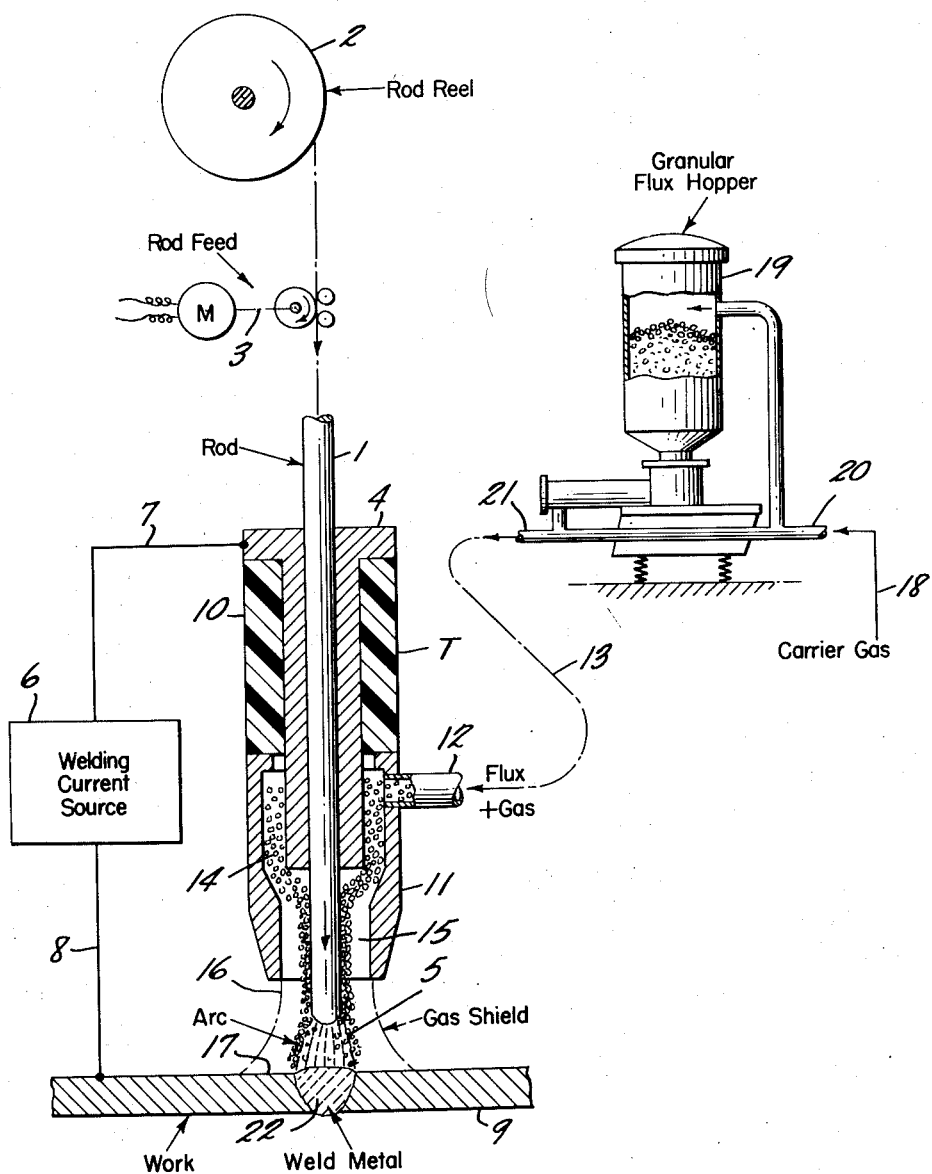

Gerard E. Claussen, Niagara Falls, and David Swan, Lewiston, N.Y., assignors to Union Carbide Corporation, a corporation of New York Filed Oct. 9, 1956, Ser. No. 614,922

4 Claims. (Cl. 148—26)

This invention relates to a new magnetic welding composition suitable for use in electric arc welding wherein granular material is fed to the arc as an adherent coating on a fusible metal electrode welding rod. The physical attraction between the welding rod and the composition is made possible by the magnetic field set up by the welding current in the former and the magnetic permeability of the latter.

Such welding method is more fully described in the Kennedy patent applications Serial No. 481,906, filed January 14, 1955, now abandoned and Serial No. 662,139, filed May 28, 1957, wherein many suitable fluxes are described. The gas normally employed in the Kennedy applications referred to hereinabove and in the present invention to carry the flux material in properly apportioned quantities to the welding zone is chemically unreactive with the molten metal and, in such welding method, serves the double purpose of supplementing the slag in shielding the molten metal from contamination with the air. Carbon dioxide was found extremely suitable in such welding system.

The primary object of this invention is to provide an inexpensive, non-metallic, magnetic material suitable for conveying reducing metals and deoxidizers to the arc by magnetic adherence to the welding rod.

Another object of the invention is the provision of an inexpensive flux with relatively few constituents so designed as to be self-slagging and/or deoxidizing in nature and wherein the contamination of the weld metal by unwanted elements is avoided.

The present welding composition departs from those previously found useful by containing none of the normal oxide constituents which, when molten, form a slag. Instead, the materials employed in the present welding compositions contain only one oxide, which is the magnetic component, and which may be reduced to varying degrees, by one or more reducing metals or alloys which react chemically with the oxide in the welding zone to form slags varying from heavy protective coats to light, filmy coverings. These self-slagging welding compositions contain considerably fewer constituents than the multioxide compositions heretofore employed and, therefore, are easier to prepare. Furthermore, by altering the composition, deoxidation of the weld metal also may be effected when it is so desired.

Another important feature of the present welding composition is the complete absence of the requirement of a metallic magnetic material, such as iron, to make possible the adherence of the composition to the welding wire. The addition to the weld metal of certain metals which are undesirable is thereby avoided.

The highly useful welding compositions of the invention (which makes possible the above aims) contain a preponderance of a ferromagnetic metallic oxide or a ferromagnetic ferrite having a magnetic permeability sufficient to be attracted to and be carried by the electrode to the arc and to act as the magnetic carrier for other constituents. The preferred magnetic ferrite for the purpose previously and subsequently to be described is magnetite, which may comprise up to 70% by weight of the entire welding composition although it is preferred in the 50–50% range. This material, although previously disclosed in the applications of Kennedy referred to hereinabove as a suitable magnetic component of fluxes of this nature, has never been used in this quantity nor as the sole oxidic constituent. From a point of economy, it is probably the cheapest material at the present time which could be employed in this capacity. In addition, it contains all the qualities necessary, when combined with certain other constituents, to form a self-slagging flux, to prevent the deposition of iron or other magnetic metals into the weld metal when it is undesirable to do so and to form the base of a composition suitable for producing a protective flux and enabling the deoxidation of the weld metal.

Approximately 2% of an alkali or alkaline earth metal fluoride, such as $CaF_2$, or cryolite, may preferably be included in the welding composition to aid in resistance to contamination from the air, especially so when the welds are being performed in a draft. Also required is a sufficient quantity of a binding material, in quantities approximating 2%, such as sodium silicate, to bond the various constituents.

The balance of the composition may comprise agents selected from a wide assortment of metals and alloys which may be in quantities necessary only to reduce the ferrite to form a heavy or light slag, or, when preferred, in sufficient proportion to deoxidize the weld metal as well. Such agents may be in the form of 17.5–30.5% FeSi and 8.5–15.5% SiMn, these particular alloys preferably being present in the ratio of 2:1, and of a combined percentage so that all the magnetite ($Fe_3O_4$) will be partially reduced, with most of the silicon and manganese forming $SiO_2$ and $MnO$, with just sufficient reactive metal remaining in elemental form, when so desired, to deoxidize the weld metal.

The invention is illustrated by the single figure of the drawing which is a diagram of apparatus for carrying out the invention in operation.

As shown in such drawing, a welding rod 1 is drawn from a supply reel 2 by a rod feed device 3 and fed through a rod guide tube 4 of electrically conductive metal, toward an arc 5. Such arc is energized by a suitable source 6 of welding current through a lead 7 that is connected to said tube 4, and a lead 8 that is connected to the work 9 to be welded. Mounted on the tube 4 is an insulator 10 which supports a cup or nozzle 11 in annularly spaced relation to the rod 1 below the tube 4. Thus, gas-containing-powdered-flux 13 entering an inlet 12 in the wall of the nozzle 11 flows in the annular space 14 in the nozzles toward the rod 1 to which the flux adheres as the gas flows out of the nozzle orifice 15, forming an annular gas shield 16 around the arc 5 and over the adjacent area 17 of the work 9.

A selected flux-carrier gas 18 is supplied, under pressure from a suitable source to a vibratory-type granular flux hopper 19 through an inlet pipe 20. Such gas picks up a regulated amount of flux and flows from such hopper 19 through an outlet pipe 21 which is connected by a flexible hose to the flux-gas inlet of torch T.

As an example of the invention a granular welding composition consisting of:

| | Percent |
|---|---|
| Magnetite | 52.6 |
| FeSi | 29.0 |
| SiMn | 14.4 |
| Cryolite | 2.0 |
| Sodium silicate | 2.0 | was fed from hopper 19 to and magnetically attracted by a ³⁄₃₂-inch No. 43 mild steel electrode 1 and carried to the arc 5 in a 7-pass butt weld in ½-inch mild steel plate 9. The plate edges were beveled to a 45-degree included angle with a half-inch space between the edges and supported by a backup bar. The welding composition was carried to the electrode with carbon dioxide gas fed at the rate of about 35 cubic feet per hour. The ratio of the welding composition to the weight of the electrode was 0.6. The operation was performed at 400 amperes, 32 volts, direct current at straight polarity (work positive).

The weld 22 thus produced was extremely sound, completely deoxidized, and had a very satisfactory surface appearance. The deoxidizing constituents reduced the magnetite and formed a heavy slag. The welding composition thereby proved self-slagging in the sense that the usual slag-forming ingredients of welding fluxes were absent.

Analysis of the slag resulting from such weld showed the presence of the following components:

|  | Percent |
|---|---|
| FeO | 17.34 |
| Fe | 17.00 |
| $SiO_2$ | 50.08 |
| MnO | 15.73 |

It is evident from the above that all of the $Fe_3O_4$ has been reduced. It is interesting to note that some of the iron which resulted from complete reduction of the magnetite remained in the slag. This was probably due to the rapid cooling of the slag. However, by reducing the amount of silicon in the mixture, no iron need by produced. This feature is important when welding non-ferrous metals where the transfer of iron to the weld metal is not desired.

It is quite evident that other metals or alloys which are compatible with the base plate may be used instead of FeSi and SiMn, such as elemental silicon, aluminum, titanium, or zirconium, singly or in combination, all of which would reduce the magnetite to FeO and which would themselves become slag-forming oxides. It is generally advisable that an excess of from 1 to 5% reducing agents be incorporated in the slag so that a sufficient amount of these metals remain to deoxidize the weld metal after the magnetite is partially reduced.

In certain instances it may be advisable to concentrate on deoxidizing the weld metal more than on forming a slag, in which case one or more deoxidizers may be used in conjunction with the magnetite. In such circumstances, very little slag would be formed by the reduction of the $FeO_4$, and complete deoxidation of the weld metal successfully could be accomplished.

Several single-pass surface beads were deposited on mild steel plates, using a ⅟₁₆-inch electrode composed of 0.12% carbon, 1.00% manganese, and .20% silicon, to convey the magnetic welding composition to the arc. The welds were accomplished at 300 amperes direct current, reverse polarity, 25 to 30 volts, at welding speeds about 10 inches per minute. Pure argon or 5% oxy-argon, fed at about 40 cubic feet per minute, was employed as the carrier gas for the granular material and to act as the shielding gas. Such shielding gas is preferred over carbon dioxide gas in the absence of heavy slag formations.

In all the welds produced, the quantity of the welding composition which was added represented about 15% of the weight of the electrode deposited. Granular flux materials of the following compositions were employed:

| Mix No. | Percent $Fe_3O_4$ | Percent FeSi | Deoxidizer-to-Magnetite Ratio |
|---|---|---|---|
| 1 | 73.4 | 26.6 | 0.18 |
| 2 | 67.7 | 32.3 | 0.25 |
| 3 | 60.0 | 40.0 | 0.33 |
| 4 | 53.4 | 46.6 | 0.44 |
| 5 | 46.6 | 53.4 | 0.57 |

About 2.5% sodium silicate, as a binder, was employed in each of the above compositions.

In the surface beads produced employing the above welding compositions, extremely sound weld metal was produced, under a light slag formation, where the silicon-to-magnetite ratio ranged from 0.25 to 0.50. The best results were obtained when the ratio was 0.30.

A wide variety of metals and alloys in varying percentages may be used with the magnetite to form magnetic welding compositions merely by determining the amount of slag it is intended to form and the amount of deoxidizers required to purify the weld metal. Other deoxidizers may include titanium, zirconium, or aluminum. Suitable compositions, such as:

|  | Percent | Percent |
|---|---|---|
| Cryolite | 2.5 | 1.8 |
| Magnetite | 67.5 | 47.1 |
| Aluminum | 15.7 |  |
| 70% ferrotitanium |  | 41.0 |
| Manganese Metal | 11.6 | 8.2 |
| Sodium Silicate | 2.7 | 1.9 | can be devised to create compatibility with the material being welded.

The magnetite, in addition to having a sufficiently high magnetic permeability, serves to oxidize the metal additions to form a slag and represents a considerable saving by forming the major portion of such welding compositions in that is is much less expensive than any other magnetic material which is normally used for this purpose. Furthermore, the magnetite is reduced primarily to FeO. Most of the magnetite in the flux, therefore, is reduced only partially and remains in the slag. This is a highly desirable feature when the sole purpose of the welding composition is to form a shielding slag and/or to deoxidize the weld metal. Accordingly, care must be exercised to use the compositions containing magnetite only when the base plate is of a metal or alloy having the same or a lower affinity for oxygen than does iron so that the weld metal will not react with the magnetite and cause iron to transfer to the weld metal.

Although the use of magnetite as the magnetic component of the welding composition is preferred because of its commercial availability at very low prices, other non-metallic magnetic ferrites may also be employed. These may include:

Manganese ferrite, $MnO \cdot Fe_2O_3$ or the ferrite-containing $Mn_3O_4 \cdot Fe_3O_4$;
Copper ferrite, $CuO \cdot Fe_2O_3$;
Magnesium ferrite, $MgO \cdot Fe_2O_3$.

The above listed ferrites, with the exception of magnesium ferrite, may also serve the secondary purpose of adding manganese and copper to the weld metal if sufficient deoxidizers are included in the welding composition to completely reduce the oxides. All have magnetic permeability sufficient to lend themselves to be used as the non-metallic magnetic constituent of welding compositions suitable for the purposes described above.

The self-slagging nature of the welding compositions, the relatively few constituents required to produce the beneficial results described above, and the inexpensive non-metallic magnetic component which may comprise the major portion of the mixtures, all combine to accent the wide commercial applicability attendant with their use.

The expression "non-metallic" as used herein means that no metals are contained within the flux which are intended to transfer to the weld metal as alloying additions.

The term "ferrite" as used herein means a metallic oxide of the general formula $MO \cdot Fe_2O_3$, equivalent to $MFe_2O_4$, wherein M is a divalent metal ion. The majority of the known ferrites are ferromagnetic. It is pointed out that certain metallic oxides which are not ferrites are also ferromagnetic, for example, LaMnO$_3$. Another example of a ferromagnetic oxide is $$Mn_3O_4 \cdot Fe_3O_4$$

which is a solid solution of Mn$_3$O$_4$ and iron ferrite, FeO·Fe$_2$O$_3$.

What is claimed is:

1. A powdered, magnetic, self-slagging flux composition for metal arc welding consisting essentially of a bonded mixture of (1) between about 47 percent and about 73 percent of a magnetic material selected from the class consisting of magnetite, manganese ferrite, the ferrite-containing oxide Mn$_3$O$_4$·Fe$_3$O$_4$, copper ferrite and magnesium ferrite, said magnetic material being the sole oxidizing component of said flux, (2) a reducing agent for said magnetic material, said reducing agent being at least one member selected from the group consisting of ferrosilicon, ferrotitanium, silicomanganese, manganese, titanium, silicon, zirconium and aluminum and being present in an amount sufficient to reduce substantially all said magnetic component, and (3) a suitable binder.

2. A powdered, self-slagging, magnetic flux composition for inert gas shielded fusible metal electrode electric arc welding, consisting of about 47 percent to about 73 percent of a magnetic component selected from the class consisting of magnetite, manganese ferrite, the ferrite-containing oxide Mn$_3$O$_4$·Fe$_3$O$_4$, copper ferrite and magnesium ferrite, said magnetic component having a magnetic permeability sufficient to be attracted to and carried by an otherwise bare metal electrode to the arc and to act as a magnetic carrier for the other constituents consisting essentially of about 2 percent of a metal fluoride, about 2 percent of sodium silicate, and the balance consisting essentially of reducing agents selected from the class consisting of ferrosilicon, ferrotitanium, silicomanganese, manganese, titanium, silicon, zirconium, and aluminum in quantities sufficient at least to reduce substantially all said magnetic components to form a slag.

3. A flux composition as defined by claim 2 in which said magnetic component is in the form of Fe$_3$O$_4$, and said reducing agents are in the form of FeSi and SiMn in the ratio of 2:1, and of a combined percentage so that substantially all such Fe$_3$O$_4$ will be at least partially reduced, with most of the silicon and manganese forming SiO$_2$ and MnO, with just sufficient metal remaining in elemental form to deoxidize the weld metal.

4. A powdered, self-slagging, magnetic welding composition in the form of a bonded mixture capable of adhering to a consumable electrode by which means said composition is carried to and melted by the heat of the arc consisting essentially of from about 47 percent to about 73 percent magnetite as the sole oxidizing constituent thereof and at least one reducing agent selected from the class consisting of ferrosilicon, ferrotitanium, silicomanganese, manganese, titanium, silicon, zirconium and aluminum, said composition being self-slagging in that substantially all of said magnetite is reduced by reacting chemically with said reducing agent to provide a slag.

References Cited in the file of this patent

UNITED STATES PATENTS

| | | |
|---|---|---|
| 1,589,017 | Lincoln | June 15, 1926 |
| 2,065,157 | Stine | Dec. 22, 1936 |
| 2,474,787 | Landis et al. | June 28, 1949 |
| 2,727,125 | Muller | Dec. 13, 1955 |
| 2,803,740 | Hyink | Aug. 20, 1957 |

FOREIGN PATENTS

| | | |
|---|---|---|
| 527,009 | Belgium | Sept. 6, 1954 |
| 608,270 | Great Britain | Sept. 13, 1948 |

OTHER REFERENCES

Hackh's Chemical Dictionary, pages 335, 450 and 729, 3rd edition, 1953.

UNITED STATES PATENT OFFICE
CERTIFICATION OF CORRECTION

Patent No. 2,965,524            December 20, 1960

Gerard E. Claussen et al.

It is hereby certified that error appears in the above numbered patent requiring correction and that the said Letters Patent should read as corrected below.

Column 1, line 72, for "50-50%" read -- 50-55% --; column 3, line 48, for "FeO$_4$" read -- Fe$_3$O$_4$ --.

Signed and sealed this 15th day of August 1961.

(SEAL)
Attest:
ERNEST W. SWIDER

Attesting Officer

DAVID L. LADD

Commissioner of Patents